(12) United States Patent
Lecheler

(10) Patent No.: US 6,308,209 B1
(45) Date of Patent: Oct. 23, 2001

(54) METHOD AND SYSTEM FOR MEASURING USAGE OF A COMPUTER NETWORK BY A NETWORK USER

(75) Inventor: Paul A. Lecheler, Allen, TX (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 09/177,673

(22) Filed: Oct. 22, 1998

(51) Int. Cl.[7] .................................................. G06F 15/173
(52) U.S. Cl. ........................ 709/224; 709/202; 709/223; 709/228; 709/235; 370/230
(58) Field of Search .................................... 709/223–224, 709/227–228, 231–235, 200–203; 370/232–233, 252–253, 229–236, 458–459

(56) References Cited

U.S. PATENT DOCUMENTS

| | | | |
|---|---|---|---|
| 5,461,614 | * 10/1995 | Lindholm | 370/394 |
| 5,864,678 | * 1/1999 | Riddle | 709/235 |
| 5,867,483 | * 2/1999 | Ennis, Jr. et al. | 370/252 |
| 5,920,691 | * 7/1999 | Tsutsui et al. | 709/201 |
| 5,963,914 | * 10/1999 | Skinner et al. | 705/11 |
| 5,968,132 | * 10/1999 | Tokunaga et al. | 709/224 |
| 5,982,780 | * 11/1999 | Bohm et al. | 370/450 |
| 6,076,113 | * 6/2000 | Ramanathan et al. | 709/224 |

* cited by examiner

Primary Examiner—Bharat Barot
(74) Attorney, Agent, or Firm—Baker Botts LLP

(57) ABSTRACT

A method for monitoring a computer network used to transfer data includes measuring (112) the amount of data transferred across the network during each of a plurality of time periods. The method also includes determining (118) an actual level of network usage by a user for each of the time periods and comparing (120) the actual level of network usage generated for each time period with an authorized level of usage. The method further includes generating (122) a flag for each of the time periods in which the actual level of network usage exceeds the authorized level of usage, 20 Claims, 2 Drawing Sheets

METHOD AND SYSTEM FOR MEASURING USAGE OF A COMPUTER NETWORK BY A NETWORK USER

TECHNICAL FIELD OF THE INVENTION

This invention relates generally to networks and more particularly to a method and system for administering a network.

BACKGROUND OF THE INVENTION

Computer networks are used to transmit data from one client computer to another. A computer network generally includes a server connected to a plurality of client computers and other communication devices. The server controls the operation of the client computers and transmits data from the server to other communication devices. The other communication devices may transmit data from the server to a server in another network.

Videoconferencing, multimedia applications, and real-time audio and video applications have recently become popular, and these applications require the transmission of large amounts of data over existing computer networks. As these applications become even more popular, existing computer networks experience problems handling the increasing volume of data that is being transmitted across the networks. The networks become saturated, which results in slower transmission of data across the networks.

In an attempt to address this problem, administrators and owners of computer networks utilize expensive transmission facilities to increase the amount of data that the computer networks can transmit. A problem facing computer network administrators is how to allocate the expense of the additional equipment to computer network users.

In the past, users have been uniformly charged for access to the computer networks regardless of the amount of data transmitted or received by each user. However, such billing practices are perceived by some to be unfair as well as inefficient As an alternative, network administrators could track how much data each user transmits across the computer network and impose higher charges only on users who transmit more data. However, this approach is not without difficulties. With many different users logging on and off a network at many different locations throughout the day, tracking each user's usage of the network requires the storage of large amounts of data. In addition, the time required to process this data can be lengthy, and such processing delays sending bills to network users. Finally, such a billing procedure requires storage and processing equipment to store and process the billing data, which results in additional expense.

SUMMARY OF THE INVENTION

Accordingly, a need has arisen for an improved method and system for administering a network based on the usage of the network. The present invention provides a method and system for administering a network based on the usage of the network that address shortcomings of prior systems and methods.

According to one embodiment of the inventions a method of monitoring a computer network used to transfer data includes measuring at least a portion of the amount of data transferred across the network to, or by, a user during each of a plurality of time periods. The method includes determining an actual level of network usage by a user for each of the time periods. The actual level of network usage generated for each time period is compared to an authorized level of usage. A flag is generated for each of the time periods in which the actual level of network usage exceeds the authorized level of usage.

According to another embodiment of the invention, an apparatus for measuring usage of a computer network by a user includes at least one counting unit for measuring at least a portion of the amount of data transferred across the network to, or by, a user during each of a plurality of time periods. The apparatus also includes an agent connected to the counting unit. The agent receives information from the counting unit, computes an actual level of network usage for each time period, and generates a signal if the actual level of network usage exceeds an authorized level of usage.

Embodiments of the invention provide numerous technical advantages. For example, in one embodiment of the invention, users of a network are billed according to their usage of the network. Therefore, users who do not transmit large amounts of data over the network are not billed as much as users who do transmit large amounts of data. Also according to the invention, networks are not required to store data about every user's usage of the network, eliminating the need to purchase extra storage and processing equipment. Further, calculating each user's bill is simplified, reducing the delay caused by the processing of the billing data. In another embodiment of the invention, network administrators can offer each network user a choice of authorized levels of usage, enabling network administrators to offer a wide range of billing options. Finally, equipment needed to measure the usage of computer networks by the users can operate without placing a burden on the networks.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Figure 1:
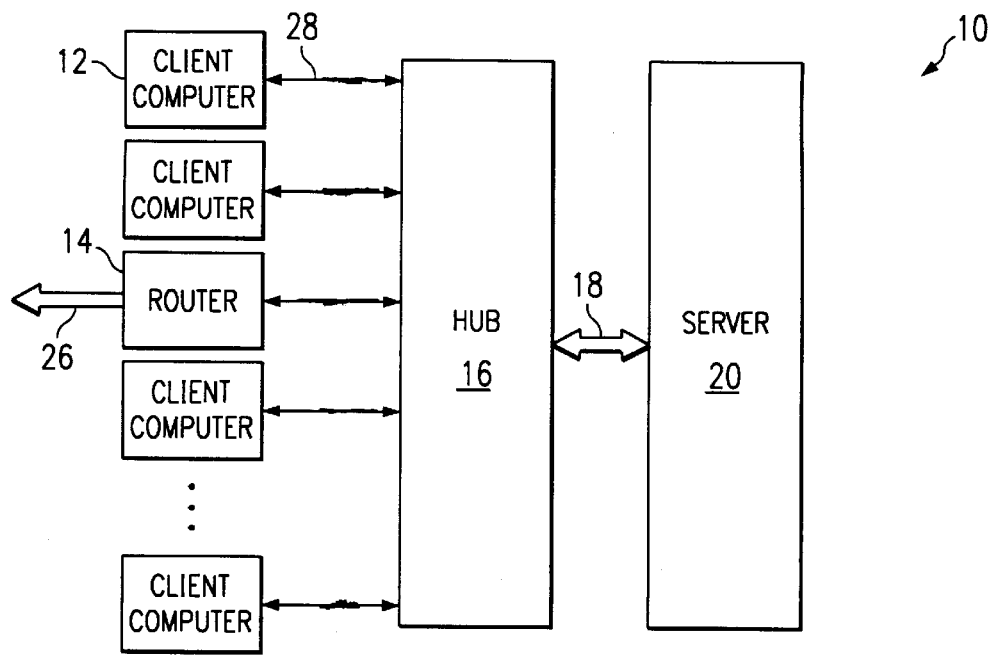
FIG. 1 is a block diagram illustrating a computer network according to the teachings of the present invention, including a hub.
Figure 2:
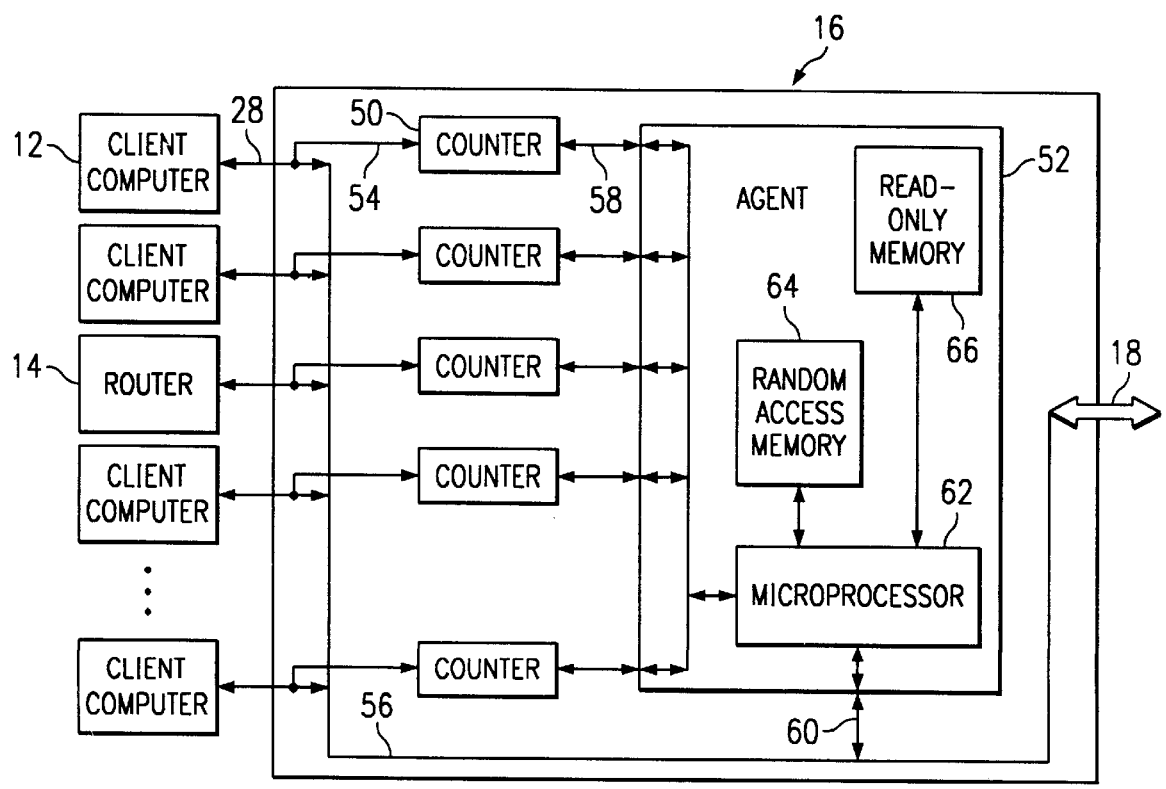
FIG. 2 is a block diagram illustrating a portion of the hub of FIG. 1, showing at least one counter and an agent for monitoring the usage of the computer network.
Figure 3:
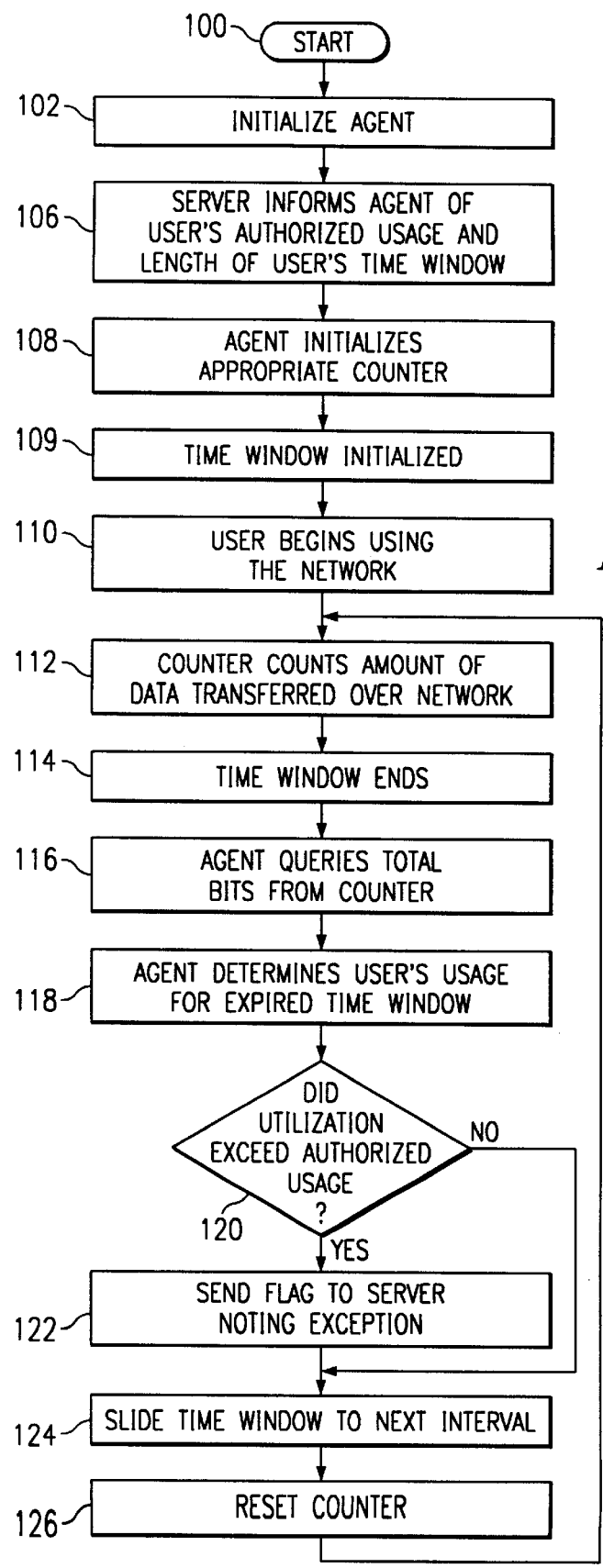
FIG. 3 is a flowchart illustrating a method for measuring the amount of data transferred across a network by a user according to the teachings of the present invention.

Embodiments of the present invention and its advantages are best understood by referring to FIGS. 1 through 3 of the drawings, like numerals being used for like and corresponding parts of the various drawings.

FIG. 1 is a block diagram of a computer network 10 used to transmit data to and from various computer systems. In this embodiment, computer network 10 is a Local Area Network; however, the teachings of the present invention may be utilized in other types of networks. Computer network 10 includes a plurality of client computers 12, a router 14, a hub 16, and a server 20. Client computers 12 are connected to hub 16 along a data path 28. A router 14 may also be connected to hub 16 along data path 28. Router 14 may also be connected to a router in another computer network (not explicitly shown) over path 26. A user of computer network 10 accesses computer network 10 by logging on to a client computer 12 or by accessing a client computer in another network that is connected to router 14. Each client computer 12 and router 14 has a corresponding port identification number in hub 16 that indicates which client computer 12 or router 14 is being used by a user.

Hub 16 is a device that connects multiple client computers 12 and router 14 to server 20. Hub 16 also allows client computers 12 and router 14 to communicate with one another without communicating directly with server 20. Each of client computers 12 and router 14 is connected to hub 16 along data path 28. Data path 28 may be, for example, an Ethernet cable or other suitable transmission media for connecting hub 16 to client computer 12 or router 14. Hub 16 communicates with server 20 over data bus 18. Data bus 18 may be, for example, an Ethernet cable or other suitable transmission media for connecting hub 16 and server 20.

In operation, hub 16 transfers data to client computers 12 and router 14 from server 20, transfers data from client computers 12 and router 14 to server 20, or allows one client computer 12 to communicate directly with another client computer 12 or router 14. Hub 16 is shown in greater detail in FIG. 2. Hub 16 operates in one of two modes during the transmission of data. First, hub 16 operates in a passive mode where hub 16 simply passes a data signal from client computer 12 or router 14 to server 20. Second, hub 16 operates in an active mode where hub 16 electrically amplifies a data signal before transmitting it.

According to the present invention, data transmissions to and from client computer 12 or router 14 pass through hub 16, including data transmitted from one client computer 12 to another client computer 12 or router 14. Hub 16 is in a position to monitor all data transmissions to and from a user of computer network 10, which allows hub 16 to measure how much data is transmitted to and from client computers 12 and router 14. Although the invention is described in the context of the computer network 10 illustrated in FIG. 1 that includes hub 16, suitable apparatuses that are capable of monitoring transmissions to and from a user of a computer network as described below may also be used instead of hub 16. Examples of such devices may include routers, switches, DSU/CSUs, FRADs, etc.

Server 20 is a computer within computer network 10. Server 20 is connected to hub 16 over data bus 18. Server 20 is accessed by network users using client computers 12 or using client computers connected to router 14. Server 20 may be any of a number of available servers, such as a computer using NOVELL NETWARE®, LANTASTIC®, WINDOWS/NT®, UNIX, or other suitable networking software.

A common example of server 20 is a file server. A file server is a computer that contains common information and services available to computer network 10. The file server acts as a centralized data storage area where multiple network users store data. Access to the data may be granted to any network user, or the file server may grant access to the data on a restricted basis. In addition, the file server contains files and software for different computer applications, such as word processing. The file server allows different network users at different client computers to access and use different computer applications. For example, the file server may simultaneously send a word processing program to one client computer 12, send an accounting program to another client computer 12, and store a file from a third client computer 12.

A problem facing administrators of computer network 10 is how to allocate the expense of increasing usage by users of computer network 10. Uniformly charging users is perceived by some to be unfair and inefficient. Tracking how much data each user transmits across computer network 10 and imposing higher charges on users who transmit more data has many difficulties. Such tracking requires the storage of large amounts of data; the time required to process tracking data can be lengthy; processing of the data delays sending bills to network users; and additional storage and processing equipment must be purchased. In the present invention, hub 16 alleviates this problem by monitoring the usage of computer network 10 and reporting when the usage becomes excessive. By reporting only when usage of computer network 10 becomes excessive, hub 16 produces smaller amounts of data that need to be stored for billing purposes. The smaller amount of data means that delays in processing the data are reduced, so bills are sent to network users more quickly. Elements within an embodiment of hub 16 that facilitate these advantages are shown in greater detail in FIG. 2, which is now described.

FIG. 2 is a block diagram of hub 16 shown in FIG. 1. Each client computer 12 and router 14 is connected to hub 16 along data path 28. Each data path 28 connects to hub 16 along a data path 56, and data path 56 connects to data bus 18. Data sent to or received from server 20 travels along data path 56. Because each client computer 12 and router 14 is connected to data path 56, client computers 12 and router 14 also communicate with one another over data path 56 without communicating directly with server 20.

When a user transmits data across computer network 10, the data takes one of two routes. In the first path, the data first passes through data path 28 to hub 16. The data travels along data path 56 to data bus 18, and the data passes to server 20. In the second path, data from one client computer 12 or router 14 first passes through data path 28 to hub 16. The data passes along data path 56 to another client computer 12 or to router 14 without being transmitted to server 20. A user receives data across computer network 10 along the same two routes.

According to the present invention, hub 16 monitors each network user's usage of computer network 10 and reports excess use of computer network 10. Hub 16 includes a plurality of counters 50 and an agent 52. Counter 50 measures the amount of data transferred across computer network 10 for each user. As used herein in this embodiment, the amount of data transferred "across computer network 10" refers to the amount of data transferred between a given client computer and hub 16, whether or not data is transferred to or from server 20. Thus, data transferred by either of the two paths described above would be considered data transferred "across the network." In addition to measuring the amount of data transferred, counter 50 also transmits, to agent 52, the amount of data counter 50 measures. Counter 50 also receives instructions from agent 52.

Counter 50 operates in one of several modes. In one mode, counter 50 measures the amount of data that a user at client computer 12 or router 14 transmits and receives across computer network 10. In another mode, counter 50 measures only the amount of data that a user at client computer 12 or router 14 transmits across computer network 10, or, alternatively, counter 50 measures only the amount of data that a user at client computer 12 or router 14 receives across computer network 10.

In one embodiment, hub 16 is part of a token ring network. A token ring network uses a specific protocol when data is transmitted, and this protocol defines the format of data transmissions in the token ring network. In this embodiment, agent 52 is configured to measure data formatted according to that protocol and contains intelligence constructed according to a Simple Network Management Protocol (SNMP). The Simple Network Management Protocol is defined by the Internet Engineering Task Force, and it includes a method for reporting information to a server such as server 20.

In another embodiment, hub 16 is part of an Ethernet network. An Ethernet network also uses a specific protocol to format data for transmission, and counter 50 is configured to measure data transferred in this type of network. In this embodiment, agent 52 may also contain intelligence constructed according to the Simple Network Management Protocol.

Agent 52 is connected to each of counters 50 along data paths 58. Agent 52 is also connected to data path 56 along a data path 60. Data path 60 allows agent 52 to transmit data to, and receive data and instructions from, server 20. Agent 52 controls the activities of counter 50. Agent 52 controls counter 50 by causing, for example, counter 50 to reinitialize. This reinitialization prompts counter 50 to stop measuring the amount of data transferred across computer network 10 and reset so that counter 50 reports no data has been transferred across computer network 10. Agent 52 also instructs counter 50 to begin measuring the data transferred across computer network 10, and agent 52 instructs counter 50 to transmit how much data has been transferred.

Agent 52 also detects when a network user is using computer network 50 excessively and signals server 20 to indicate this excessive use so that appropriate action may be taken. According to one embodiment, each network user has a user identification. The user identification identifies who each user is and allows the users to log on to computer network 10 from different client computers 12 or through router 14. Each user also has an authorized level of usage. The authorized level of usage defines how much data the user is authorized to transfer across computer network 10 within a given time window. For example, a user may be authorized to transfer ten megabytes of data across computer network 10 every thirty seconds. Each user may have a different authorized level of usage. For example, another user may be authorized to transfer twenty megabytes across computer network 10 every thirty seconds. In one embodiment of the invention, each network user selects an authorized level of usage from a tiered set of authorized usages. For example, in a set of three tiers, a Bronze level of access authorizes the transfer of zero to ten megabytes every thirty seconds; a Silver level of access authorizes the transfer of ten to thirty megabytes every thirty seconds; and a Gold level of access allows the transfer of over thirty megabytes every thirty seconds. Each level of access has a different base fee, with the Bronze level being cheaper than the Gold level. Network users select the level of access they want and pay the appropriate base fee.

Server 20 may contain the user identifications and each user's corresponding authorized level of usage. This authorized level may be provided by server 20 to agent 52. Server 20 may also store the port identification number of client computer 12 or router 14 that the network user is currently using.

Based on the authorized level of usage, agent 52 monitors the network user's usage of computer network 10. Agent 52 signals counter 50 over data path 54 to begin measuring the amount of data the network user transfers across computer network 10. Agent 52 waits for a period of time, and the length of this period of time is equivalent to a predetermined time window length. Once the time window elapses, agent 52 instructs counter 50 to transmit the amount of data counter 50 has measured After counter 50 transmits the measurement, agent 52 takes that measurement and calculates an actual level of network usage for the network user. The actual level of network usage is the rate at which data were transferred across computer network 10 for the preceding time window.

Agent 52 compares the actual level of network usage to the authorized level of usage. If the actual level of network usage is less than the authorized level of usage, the network user's use of computer network 10 is determined to be not excessive during the preceding time window. In such a case, agent 52 does not provide a signal to server 20. If the actual level of network usage exceeds the authorized level of usage, agent 52 signals server 20 that the network user has exceeded his or her authorized level of usage. Agent 52 signals server 20 by sending a signal or a flag to server 20 along data path 56.

The signal or flag sent by agent 52 identifies the network user that used the network excessively. In one embodiment, agent 52 transmits a signal or flag to server 20 that contains either the user identification or the port identification number of the client computer 12 or router 14 that the network user is using. The signal or flag may indicate only that the authorized level of usage was exceeded. Alternatively, the signal or flag may contain additional information regarding the level of usage. For example, the signal or flag may contain the actual level of network usage that occurred during the preceding time window, and server 20 may use that information to determine by how much the user exceeded his or her authorized level of usage. As another example, agent 52 may determine by how much the user exceeded his or her authorized level of usage, and agent 52 may include that figure in the signal or flag. In yet another example, agent 52 is programmed with the different levels of service offered to the network users. For example, agent 52 stores the authorized level of usage and time window length for each of the Bronze, Silver, and Gold levels of service. In such a case, when a network user exceeds his or her authorized level of service, agent 52 determines which level of service the network user actually used during the preceding time window. For example, if a network user having the Bronze level of access transferred thirty one megabytes of data in the preceding thirty second time window, agent 52 determines that the user actually entered the Gold level of service during the time window. The signal or flag sent to server 20 indicates that the network user utilized the Gold level of service.

The time window used by agent 52 during which counter 50 measures the amount of data transferred across computer network 10 operates in several modes. In one embodiment, one time window does not overlap with another time window. For example, counter 50 measures the amount of data transferred across computer network 10 during the time period from zero seconds to thirty seconds. Agent 52 determines if the actual level of network usage exceeded the authorized level of usage. Another time window begins, and counter 50 measures the amount of data transferred across the network during the time period from thirty seconds to sixty seconds. Another time window covers the period between sixty and ninety seconds, and this process repeats until the user logs off of computer network 10.

In another embodiment, one time window partially overlaps with other time windows, creating a sliding time window. For example, one time window covers a period from zero to thirty seconds. Another time window covers the period from ten to forty seconds, and a third time window covers the period from twenty to fifty seconds. This repeats until the network user logs off of computer network 10.

Server 20 stores the information from each of the flags or signals for use in billing users of network 10. According to one embodiment, each network user pays a base fee for his or her level of access to computer network 10. If a network user never uses computer network 10 excessively, no flags or signals are generated, and the user's bill simply consists of the base fee. If the user exceeds his or her authorized level of usage at least once, the user's bill consists of the base fee and a surcharge for the excessive use. In one embodiment, the surcharge simply represents a flat fee for each instance in which the user exceeded his or her authorized level of usage. In another embodiment, different surcharges are assessed against the network user based on the extent of the excess use. For example, a user with a Bronze level of access pays a small surcharge whenever the user exceeds the Bronze level of access and a larger surcharge when the user exceeds the Silver level of access.

One embodiment of agent 52 contains a microprocessor 62, a random access memory 64, and a read-only memory 66. Microprocessor 62 controls when agent 52 instructs counter 50 to begin and end measuring the amount of data transferred and when agent 52 instructs counter 50 to transmit its measurements. Microprocessor 62 also computes whether the actual level of network usage exceeds the authorized level of usage. In another embodiment, microprocessor 62 also determines the level of service that a network user actually used when the authorized level of usage is exceeded. Microprocessor 62 is connected to data path 60, enabling microprocessor 62 to transmit a flag or signal to server 20 over data paths 60 and 56. Microprocessor 62 is also connected to random access memory 64 and read-only memory 66. Random access memory 64 stores data transferred to agent 52 from counters 50. Random access memory 64 also stores data being transferred to or received from server 20. Read-only memory 66 may include preloaded microprocessor instructions for use by microprocessor 62 in operating and controlling agent 52 and counters 50.

Although in the above examples, the length of the time windows was thirty seconds, the time windows may have any length desired by administrators of computer network 10. It has been determined that a length for the measurement time window that results in a signal or flag being produced for less than twenty percent of the users is particularly advantageous; however, embodiments outside this range are also advantageous. Furthermore, in one embodiment a duration for the time windows of ten to fifteen seconds has been determined to be particularly advantageous in one embodiment.

The use of an apparatus that monitors usage of a network and generates a flag or signal when an authorized level of usage is exceeded, such as hub 16, or other devices capable of performing such a probing function, such as routers, switches, etc., provides numerous advantages over other devices. Such use allows users to be billed according to their usage of the computer network, requiring users who transmit large amounts of data over a given time window to pay more for access to computer network 10. Also, computer network 10 only needs to store data contained in each flag or signal generated by hub 16, rather than data about every user's usage of computer network 10. This avoids the need to buy expensive storage devices, as well as extra processors to process the data. Further, delays caused by processing billing data are reduced. Finally, counters 50 and agent 52 monitor each network user's use of computer network 50 without saturating computer network 50 and causing the transmission of data across computer network 10 to slow. The behavior of hub 16 that generates these benefits is shown in FIG. 3, which is now described.

FIG. 3 is a flowchart illustrating a method for measuring the amount of data transferred across a network by a user according to the teachings of the invention. The method begins at a step 100. At a step 102, agent 52 is initialized. This may include, for example, resetting microprocessor 62 of agent 52 and loading instructions into random access memory 64 of agent 52. At a step 106, server 20 transmits to agent 52 the authorized level of usage associated with each client computer 12. At a step 108, agent 52 initializes the appropriate counter 50 that will measure the amount of data transferred to and from client computer 12 or router 14.

At a step 109 the time window begins. The user may begin using the network at a step 110, and agent 52 instructs counter 50 to begin measuring the amount of data transferred across computer network 10. At a step 112, counter 50 measures the amount of data transferred. At a step 114, agent 52 recognizes that the time period of a predetermined time window has elapsed. Agent 52 queries counter 50 to transmit its measurement of how much data was transferred during the time window. At a step 116, counter 50 transmits to agent 52 the amount of data transferred across computer network 10 during the time window in response to a query from agent 52.

After agent 52 receives the amount of data transferred during the preceding time window, at a step 118 agent 52 performs calculations to determine the network user's actual level of network usage for the expired time window. At a step 120, agent 52 compares the user's actual level of network usage with the authorized level of usage received from server 20. If the actual level of network usage exceeds the authorized level of usage, at a step 122 agent 52 sends a flag or signal to server 20 informing server 20 that the user exceeded his or her authorized level of usage. As described above, the flag or signal contains either the user identification or the port identification number. In one embodiment, the flag or signal also contains the user's actual level of network usage, the amount that the actual level of network usage exceeded the authorized level of usage, or the level of service the user actually used. If the actual level of network usage does not exceed the authorized level of usage, step 122 is skipped.

At a step 124, agent 52 establishes another time window. As explained above, the new time window may or may not overlap with the preceding time window. At a step 126, the counter is reset and then the process repeats, starting at step 112.

This method provides numerous advantages over prior methods. The method allows network administrators to bill users according to their usage of computer network 10. Also, the method is implemented without forcing computer network 10 to store data about every user's usage of the network. The method allows for simplified calculations of each user's bill. Further, the method can be configured for each individual network user, where each network user has a different authorized level of usage and a different length for the time windows. Finally, the method can be implemented without saturating computer network 10.

Although the present invention and its advantages have been described in detail, it should be understood the various changes, substitutions, and alterations can be made therein without departing from the spirit and scope of the present invention as defined by the appended claims.

What is claimed is:

1. A method of monitoring a computer network used to transfer data, comprising:

measuring at least a portion of the amount of data transferred across the network to, or by, a user of the network during each of a plurality of time periods;

determining an actual level of network usage by the user for each of the time periods;

comparing the actual level of network usage generated for each time period with an authorized level of usage;

generating a flag for each of the time periods in which the actual level of network usage exceeds the authorized level of usage; and computing a bill in response to generating a flag when the actual level of network usage exceeds the authorized level of usage.

2. The method of claim 1, further comprising storing each flag generated when the actual level of network usage exceeds the authorized level of usage.

3. The method of claim 1, wherein each of the plurality of time periods is 10 to 15 seconds in duration.

4. The method of claim 1, wherein each of the plurality of time periods partially overlaps with at least one other of the plurality of time periods.

5. The method of claim 1, further comprising selecting the authorized level of usage from a tiered set made up of at least two authorized usages.

6. The method of claim 5, further comprising identifying the authorized usage of the tiered set that the actual level of network usage falls within when the actual level of network usage exceeds the authorized level of usage.

7. The method of claim 1, wherein measuring the amount of data transferred across the network comprises measuring the amount of data transmitted by a user.

8. The method of claim 1, wherein measuring the amount of data transferred across the network comprises measuring the amount of data received by a user.

9. The method of claim 1, wherein measuring at least a portion of the amount of data transferred comprises measuring the amount of data transferred across the network by the user.

10. The method of claim 1, wherein measuring at least a portion of the amount of data transferred comprises measuring the amount of data transferred across the network by the user and measuring the amount of data transferred across the network to the user.

11. An apparatus for measuring usage of a computer network by a user, comprising:

a counting unit for measuring at least a portion of the amount of data transferred across the network to, or by, the user during each of a plurality of time periods; and an agent connected to the counting unit, the agent being operable to receive information from the counting unit and to compute an actual level of network usage for each time period, the agent being further operable to generate a signal if the actual level of network usage exceeds an authorized level of usage, the agent being further operable to select the authorized level of usage from a tiered set made up of at least two authorized usages.

12. The apparatus of claim 11, wherein the counting unit and agent reside within a computer network hub.

13. The apparatus of claim 11, further comprising a server operable to notify the agent of the authorized level of usage for a user and a length for each of the time periods.

14. The apparatus of claim 11, wherein the counting unit measures the amount of data transmitted by a user across the network.

15. The apparatus of claim 11, wherein the counting unit measures the amount of data received by a user across the network.

16. The apparatus of claim 11, wherein each time period has a length such that the agent generates a signal for less than 20% of the time periods.

17. The apparatus of claim 11, wherein each of the plurality of time periods partially overlaps with at least one other of the plurality of time periods.

18. The apparatus of claim 11, wherein the agent is further operable to compute a bill when the actual level of network usage exceeds the authorized level of usage.

19. An apparatus for measuring usage of a computer network by a network user, comprising:

at least one counting unit operable to measure at least a portion of the amount of data transferred across the network to, or by, the network user during each of a plurality of time periods;

an agent receiving information from the counting unit, the agent being operable to select an authorized level of usage from a tiered set comprising at least two authorized usage levels and to compute an actual level of network usage for each time period, the agent being further operable to generate a signal if the actual level of network usage exceeds the authorized level of usage; and a server, wherein the server notifies the agent of the authorized usage levels of the tiered set and a duration for each of the time periods.

20. The apparatus of claim 19, wherein the server is operable to compute a bill when the actual level of network usage exceeds the authorized level of usage.

* * * * *